Sept. 15, 1942.　　R. F. NORRIS ET AL　　2,295,750

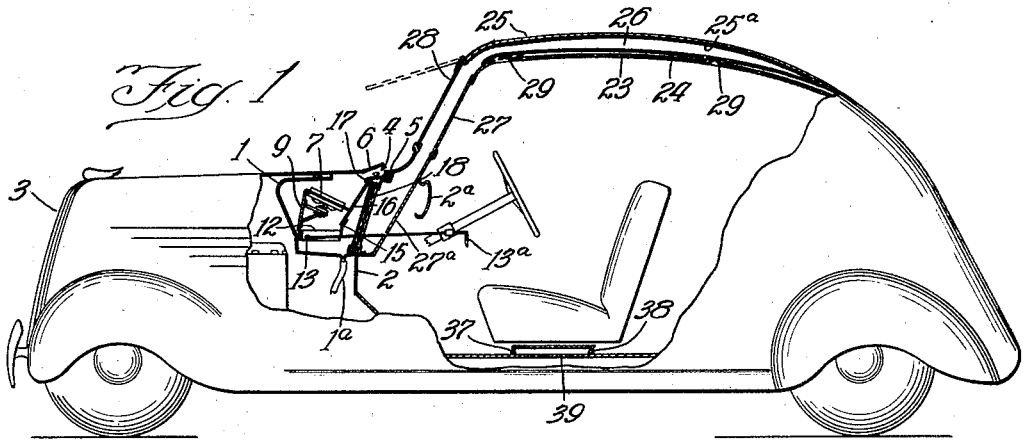
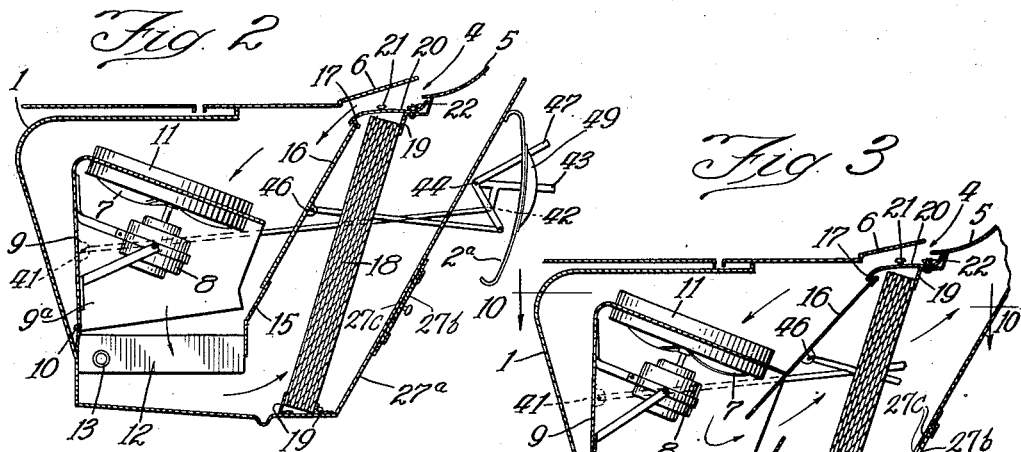
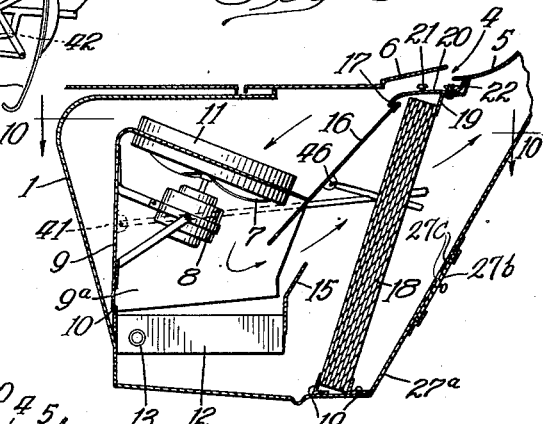
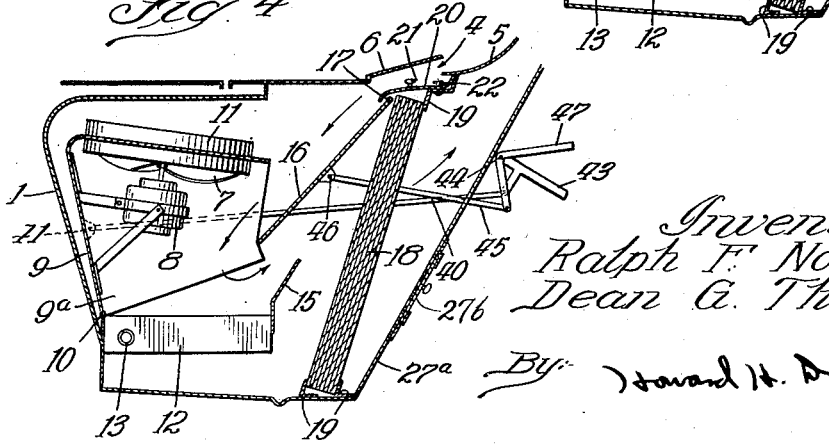

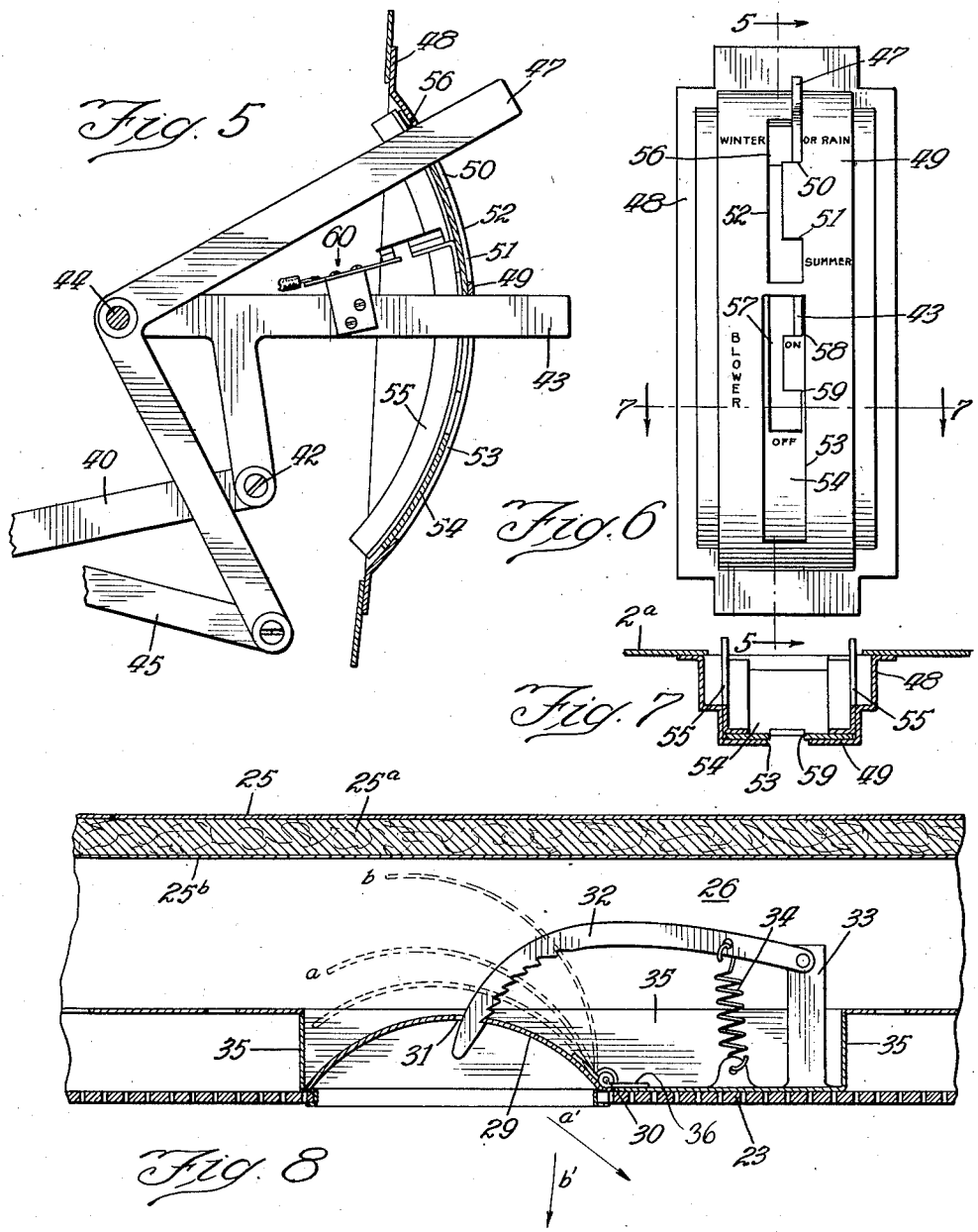

VEHICULAR AIR CONDITIONING SYSTEM

Filed Feb. 14, 1938　　4 Sheets—Sheet 3

Inventors
Ralph F. Norris
Dean G. Thomas
By Howard H. Darbo
Atty.

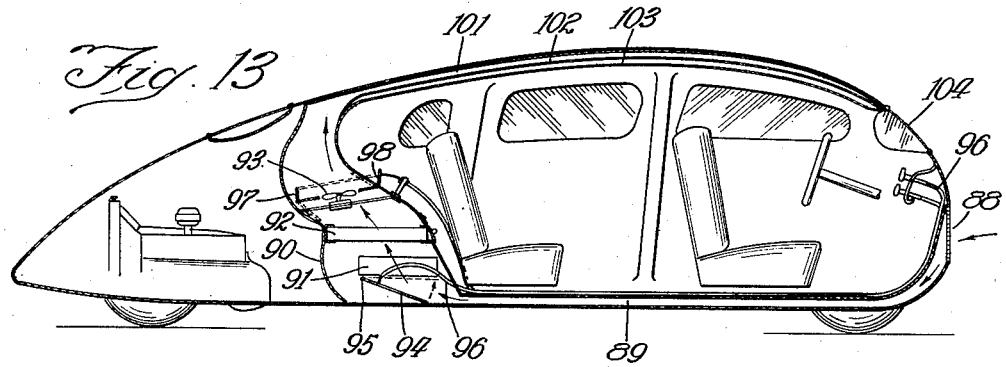
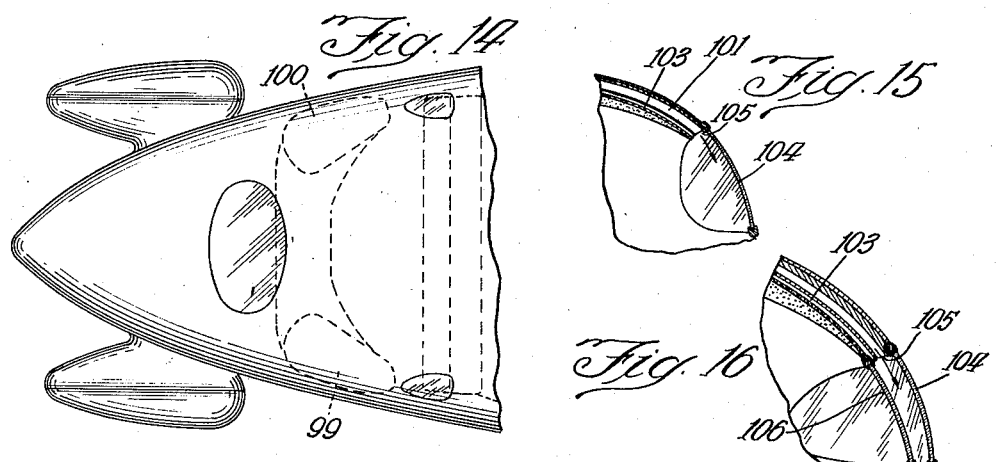
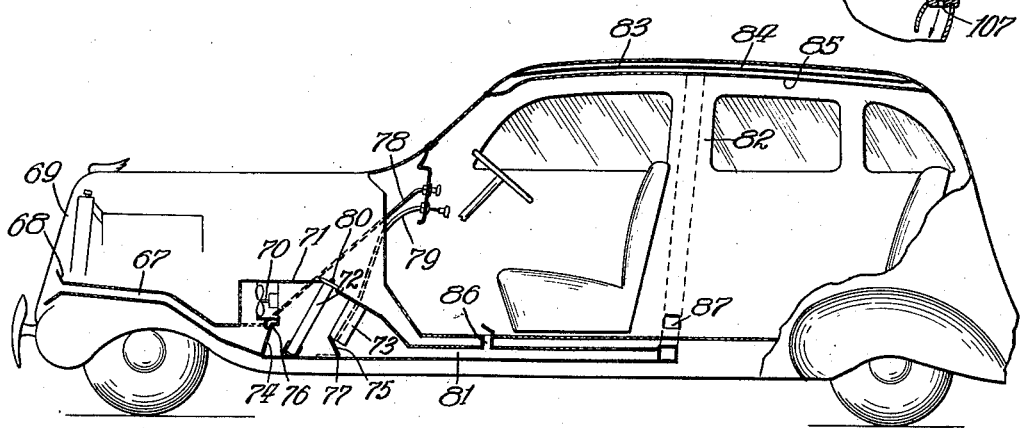

Patented Sept. 15, 1942

2,295,750

UNITED STATES PATENT OFFICE 2,295,750

VEHICULAR AIR CONDITIONING SYSTEM

Ralph F. Norris, Madison, and Dean G. Thomas, Stoughton, Wis., assignors, by mesne assignments, to Nash-Kelvinator Corporation, Kenosha, Wis., a corporation of Maryland Application February 14, 1938, Serial No. 190,394

12 Claims. (Cl. 98—2)

This invention relates to ventilating and air-conditioning systems and particularly to the conditioning of air used for the ventilation of the passenger compartments of automobiles and other vehicles and to the distribution of the conditioned air in the vehicle enclosure.

The primary object of this invention is to condition and distribute ventilating air in an automobile to provide maximum comfort to the driver and passengers thereof. Specific objects include the provision of sufficient air to the body enclosure of the automobile to remove disagreeable odors therefrom and maintain the air therein in fresh, wholesome condition, and to provide means for filtering, heating or cooling and humidifying or de-humidifying the ventilating air; the introduction of ventilating air into the body enclosure without drafts, except controled air turbulence as desired by the individual affected, in such a way as to maintain a substantially uniform temperature distribution throughout the enclosure; the prevention of condensation on interior surfaces of the automobile and elimination of visual obstacles on the exterior surface of the windshield, such as snow and ice; the elimination of the danger of asphyxiation due to infiltration of noxious gases from the engine or exhaust system. Other objects will become apparent as the following detailed description proceeds.

In the drawings:

Fig. 1 is a longitudinal section of an automobile equipped with our air-conditioning and distribution system, showing the arrangement of the air-conditioning equipment in which ventilating air passes through the fan and tempering unit;

Fig. 2 is a detailed, sectional view of the conditioning apparatus taken longitudinally of the automobile as in Fig. 1, showing the arrangement in which the fan is by-passed and the air passes through the tempering unit;

Fig. 3 is a sectional view similar to that shown in Fig. 2 in which the air-conditioning equipment is arranged to cause the ventilating air to pass through the fan and to by-pass the tempering unit;

Fig. 4 is a sectional view similar to Fig. 2 and showing the air-conditioning equipment arranged to by-pass the air around both the fan and the tempering unit;

Fig. 5 is a detailed sectional view showing the synchronized mechanism controlling the relative arrangement of the air-conditioning equipment within the conditioning chamber, the view being taken at 5—5 of Fig. 6;

Fig. 6 is a front view of the index plate of the synchronized control mechanism;

Fig. 7 is a detailed sectional view of the synchronized control index arrangement taken at 7—7 of Fig. 6;

Fig. 8 is a detailed view of an individual air scoop or deflector;

Fig. 13 is a longitudinal sectional view of an automobile showing a modified embodiment of our invention;

Fig. 14 is a top view of the rear portion of the automobile of Fig. 13;

Fig. 15 is a fragmentary detailed view of a modified air-distributing construction of the automobile shown in Fig. 13;

Fig. 16 is a fragmentary detailed view of a further modification of the air-distributing construction of the automobile of Fig. 13, and Fig. 17 is a longitudinal sectional view showing a further modification of our invention.

Figure 9:
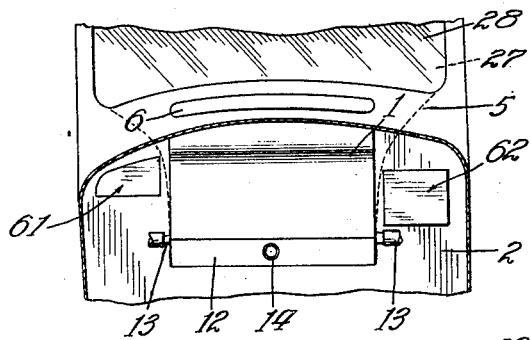
Fig. 9 is a view of the dash from the front of the automobile showing the air-conditioning chamber mounted thereon.
Figure 10:
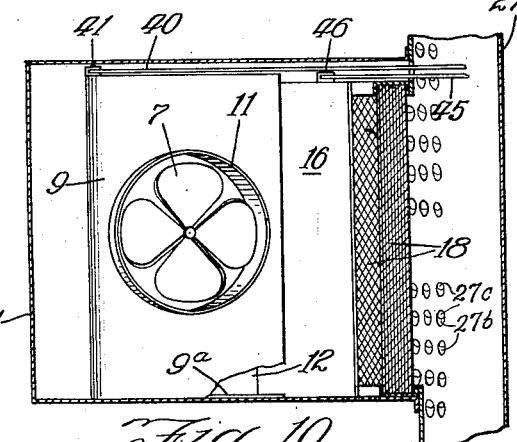
Fig. 10 is a sectional plan view of the air-conditioning apparatus taken at 10—10 of Fig. 3.

The general arrangement of the ventilating system constituting the preferred embodiment of our invention is illustrated in Figs. 1 to 11. The air-conditioning chamber formed by housing 1 is mounted upon dash 2 of automobile 3. An elongated opening 4 in cowl portion 5 is provided with a hinged cover 6 which may open forwardly but is preferably arranged to open rearwardly, as shown, to deflect and eliminate foreign particles borne by the air. Any suitable mechanism may be employed to adjust the position of cover 6 to thereby regulate the volume of air taken into the system for ventilation. A water drain for chamber 1 is provided at 1a. Within housing 1 a fan 7 and electric motor 8 are mounted by means of suitable brackets to fan housing 9. The fan must be capable of building up an appreciable pressure head. As shown in detail in Figs. 2 to 4, fan housing 9 is a V-section member extending between the two sides of conditioning chamber 1 and is journaled at 10 for the purposes hereinafter described. A circular opening is provided in the free leg, the upper lateral surface of the fan housing, as shown, to accommodate the fan blades, and collar 11 is arranged in this opening to guide the air.

A radiator or other air-tempering unit 12 is mounted horizontally, preferably, in the lower portion of the air-conditioning chamber. Although this unit will be referred to herein as a radiator, for convenience, and its function referred to as heating of the air, it may be a refrigerating unit or a humidifying or de-humidifying apparatus, or a combined unit adapted to either heat or cool and humidify the air in accordance with the outdoor climatic conditions at any particular time. The radiator is preferably a single pass, compound type having end inlets 13 and outlet 14 rather than the single pass, single radiator type, so as to provide substantially uniform heating of the ventilating air at all points across the conditioning chamber. A double pass single radiator with over and under inlet and outlet would serve equally well. A valve may be provided at inlet or inlets 13 operable from within the vehicle by means of a suitable lever arrangement, such as 13a, to regulate the flow of heating (or cooling) fluid through the radiator and thus regulate the degree of heating (or cooling) of the ventilating air. A deflector stop 15 is mounted on the rear side of the radiator to cooperate with deflector 16 and to direct the air as hereinafter described. Deflector 16 is mounted by means of hinge 17 to permit rotary adjustment thereof. This deflector operates between ends 9a of housing 9 to prevent leakage of air from the tempering or outlet zones of the conditioning chamber to the intake zone with consequent loss of head from the system.

Filter 18 is arranged in an aperture in the dash to form the outlet of the conditioning chamber, suitable guide members 19 retaining the filter in position and preventing leakage of air around the filter. The filter may readily be removed when dirty for replacement or cleaning by removing cover 20 with the aid of hand knob 21 after loosening wing nut 22. Provision is made to permit cover 6 to open sufficiently widely to provide ready access to the filter. Although any suitable low resistance filter may be used, that shown in Walton Patent No. 2,070,073, dated February 9, 1937, is exceptionally well suited for the purposes of this invention in view of the high filtering efficiency and low air resistance characteristic of this particular filter element.

Figure 11:
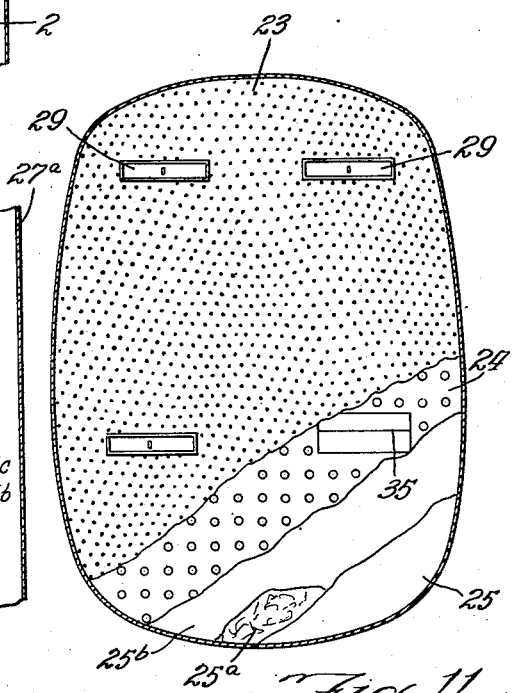
Fig. 11 is a broken inverted plan view of the air-distributing apparatus of the automobile shown in Fig. 1.

After being conditioned, the air may be distributed within the passenger compartment of the vehicle from the ceiling thereof by means of the arrangement disclosed in Norris co-pending patent application Serial No. 95,976, filed August 14, 1936, now Patent No. 2,172,944, dated Sept. 12, 1939. Although this means of distributing the air is highly desirable, it is not an indispensable part of the invention as any suitable means may be used to introduce the ventilating air into the enclosure. As shown in Figs. 1 and 11, a perforated distributing panel 23 forms the ceiling presented to view from within the automobile. A control panel 24, substantially co-extensive with the distributing panel is spaced between the top 25 of the automobile and the distributing panel. A suitable insulating material 25a may be applied to the under surface of the top, which material may have sound-absorbing qualities whereby to reduce the noise level of the vehicle enclosure. A suitable material for this purpose is shredded wood fibre, such as balsam wool, covered with an air-impervious, sound-transparent covering 25b, such as paper, on the surface exposed to the plenum chamber. The total open area of the control panel is very small compared with its total area and with the open area of the distributing panel. It is preferably provided with a comparatively small number of large holes or slots distributed throughout its area while the distributing panel is preferably provided with a large number of small perforations to more evenly distribute the air and present a neater appearance. These panels may be of hard-pressed fibreboard, sheet metal, or other self-supporting sheet material. This air-distributing construction is more fully described in the above Norris reference.

Air ducts are provided to conduct the air from the conditioning chamber to plenum chamber 26. In the preferred embodiment of our invention such communication is provided, in part, by a double windshield construction in which the interior windshield 27 is spaced from exterior windshield 28 and suitable openings are provided at the lower and upper edges of the windshield to establish the necessary through communication. The sides of this duct are shown in dotted lines in Fig. 9. Duct section 27a connects the conditioning chamber with the space between the windshields. This arrangement is preferred in view of the collateral advantages attendant upon its use. In winter the warm air passing between the two glass panes eliminates undesirable condensation of moisture on the interior surface of windshield 27, thus obviating any need of fans or other appliances heretofore used to prevent this condensation. The warming of the exterior windshield 28 melts any ice thereon and prevents further formation of ice on this surface. These advantages are of great value and compensate for the additional expense of the construction. Provision may be made for hinging either windshield to permit access to the inside surfaces for cleaning as shown, for example, by the dotted lines in Fig. 1.

In the construction described, air is taken in at the cowl and, after passing through the conditioning chamber, is conducted to the overhead plenum chamber and distributed evenly throughout the area of the ceiling of the car to thereby prevent drafts or localized overheated zones to the discomfort of the driver or passengers of the vehicle. Experience has shown that personal desires differ and that a direct draft is often desirable during the warm weather. We have accordingly provided individually controllable deflectors or air scoops 29, shown in detail in Fig. 8, designed to intercept a part of the moving air. Installation of these deflectors is optional. A plan of the distributing panels with deflectors is shown in Fig. 11. As shown in the latter illustration, four individual deflectors are arranged to be available to the normal positions of the four occupants of the automobile. Each deflector assembly is boxed off from the space between the control and distributing panels by partitions 35 to prevent escape of air through the large opening in the control panel provided for the deflectors to the perforated distributing panel. These deflectors include a baffle or blade portion, designated by numeral 29, preferably curved for the purposes hereinafter set forth. This blade 29 is hinged at 30 to open forwardly and has an opening 31 adapted to receive the ratchet portion of arm 32. The purpose of this ratchet arm is to retain deflector blade 29 in any desired position. It is pivoted to support 33 and urged against the rear edge of opening 31 by spring 34. Supporting structure 35 braces the control and distributing panels as well as provides mounting means for the deflector mechanism. The deflector may be opened to any desired position, as indicated by dotted lines, by pushing it upwardly with the hand. The edge of the opening 31 is engaged by a tooth of the ratchet rack of arm 32, preventing return of the deflector blade to the closed position without disengagement of the ratchet and blade by pressure applied upwardly at the end of arm 32. Such pressure raises the arm slightly and permits blade 29 to fall. It may be desirable to provide a wire spring 36 to positively urge deflector blade 29 downwardly. Due to the curvature of the blade 29, it is possible for the individual operating the mechanism to direct the incoming air against any part of his person. Thus when the deflector is in position $a$, the air will be directed against the face or upper portion of the body as indicated by arrow $a'$, and when the deflector is in position $b$ the air will be deflected to a greater extent as indicated by arrow $b'$.

It will be noted that the entire deflector structure mechanism is above the surface of the automobile ceiling. It cannot cause injury to persons in the vehicle during an accidental collision.

It is desirable to exhaust the air from the vehicle to the atmosphere at a point or at a plurality of points near the floor thereof. In Fig. 1 adjustable outlets of any well known type, such as a sliding shutter, are indicated at 37 and 38 and permit air from the foot zones of the front and rear seats, respectively, of the two-seated sedan illustrated to flow to the outlet at 39. With this arrangement the tempered air is caused to flow downwardly within the vehicle, ventilating all parts thereof and maintaining a comfortable temperature in the foot zones. Obviously, air may be exhausted at other points, as, for example, through perforated floors either covered or uncovered by a loosely woven fabric.

Since the inlet of the ventilating system is located at a point subject to an air pressure when the vehicle is in motion, the fan 7 is necessary only when the automobile is standing still or traveling less than approximately 8 miles per hour. In order to conserve power required to operate the fan and to take advantage of the pressure generated by motion of the automobile to supply greater volumes of air for ventilation than can be delivered by the fan, means are provided for by-passing the air around the fan. If the fan were permitted to remain in the air circuit, the resistance caused by this obstruction would prevent entrance of more than a very small proportion of the air otherwise available for ventilation. This undesirable obstruction may be obviated either by removing the portion of fan housing 9 surrounding the fan blades and permitting the air to pass around the fan, the latter remaining stationary, or the entire fan and housing assembly may be shifted to permit the air to by-pass the assembly. The latter arrangement which is more compact and is considered preferable for other reasons, is shown in Figs. 1 to 4 and Fig. 10. Figs. 1 and 3 show the fan in operating position and Figs. 2 and 4 indicate the position of the fan when the air is permitted to by-pass directly to the radiator and filter.

Shifting of the fan and housing assembly from the position shown in Figure 3 to that shown in Figure 4 will not result in a complete by-passing of air around the fan assembly; some air will still flow through the fan assembly but the largest percentage will by-pass. This is so simply because of the tendency of any moving fluid to take the path of least resistance, and a non-rotating fan offers considerable resistance to the passage of air therethrough; similarly with the radiator 12, the deflector 16 may cause all of the air to flow through the radiator 12 (as in Figure 2) or it may permit the larger portion to by-pass the radiator (as in Figures 3 and 4). The downward motion of the air through the casing 1 may however cause some small quantity to pass through radiator 12.

Although in some installations tempering unit 12 may be adapted to convert the incoming air to the desired temperature and humidity conditions, in the great majority of installations cooling and/or humidifying means are not provided and only a radiator is provided, to be used in warming the air during cold weather. During warm or mild weather the supply of heating fluid to radiator 12 may be partly or entirely shut off or the radiator may be by-passed entirely. In view of the substantial restriction to the flow of air offered by the radiator, it is preferable to provide such by-passing means. For this purpose a deflector 16 may be swung outwardly, as shown in Figs. 3 and 4, permitting the air to pass between deflector stop 15 and deflector 16 to the filter instead of causing it to pass through the radiator as shown in Figs. 1 and 2. The temperature of the air can be controlled by regulating the proportion of air by-passed around the radiator, as by adjusting the position of deflector 16, as well as by regulating the amount of heating fluid to the radiator.

The mechanism for controlling the arrangement of the fan and adjustable deflector 16, and thus the path of the air to cause it to follow a predetermined circuit through the conditioning chamber, is shown in a general way in Fig. 2 and in detail in Figs. 5 to 7. Link 40 is attached at 41 to fan housing 9 and connected at 42 with lever 43, the latter being pivoted at 44. Link 40 may pass on one side of the filter or may be under the filter, depending on the particular construction. It will be seen that movement of lever 43 will cause corresponding movement of fan housing 9 about the hinge 10 to lower the fan into position or remove it from the path of the air, as desired. Link 45 connects deflector 16 at 46 with lever 47 which latter is also pivoted at 44. An index 48 may conveniently be mounted on the instrument board 2a of the automobile. This index includes a curved portion 49 having a center of curvature at 44. Since the operative position of the fan must take the three different positions shown in Figs. 1, 3 and 4 and there being a definite relationship between deflector 16 and the fan in each arrangement, it is desirable to synchronize the controls so that the fan may be manipulated independently of deflector 16 while it is automatically shifted upon a change in position of the deflector. From Figs. 5 to 7 it will be seen that a double index plate is used, the outer member 49 being stationary and provided with notches 50 and 51 and slot 52 to guide lever 47 and lock it in position. A larger slot 53 is also provided in the stationary plate. A secondary, sliding index plate 54 is arranged within the general structure 48 bearing against the inner surface of stationary plate 49 and guided by inner member 55 which is fixed to index body 48. The sliding index plate has an opening 56 through which lever 47 extends and which is of sufficient width to permit sidewise movement of this lever in removing it from notch 50 or 51 into slot 52 in manipulating deflector 16. This slot 56 in the sliding index plate does not extend vertically, so that as lever 47 is moved downwardly in slot 52 the entire sliding index plate 54 is shifted to the lower position. The sliding plate is provided with slot 57 and notches 58 and 59 for the on and off positions, that is, the operative or inoperative positions, of the fan. It is thus seen that although lever 43 may be shifted to place the fan in the air circuit or to remove it therefrom independently of lever 47 and deflector 16, manipulation of lever 47 automatically shifts the fan correspondingly without, at the same time, altering the status of the fan, as from operative to inoperative position or vice versa. Complete control of the system is thereby provided.

An electric switch is designated generally by the numeral 60. The purpose of this switch is to break the fan circuit when the fan is shifted to the inoperative position, and to close this circuit when the fan is shifted into the air circuit of the ventilating system. The stationary contact of this switch may be attached to the sliding index plate as the ground terminal, the movable contact being attached to lever 43, insulated therefrom, and electrically connected with the positive terminal of the fan. Any suitable switch mechanism may be used. The paths of the air are indicated by arrows in Figs. 2 to 4. In the interest of clarity, and assuming tempering unit 12 to be a heating radiator only, it may be well to designate the arrangement of Fig. 1 as the winter parking position, the air passing through both fan and radiator; Fig. 2 as winter driving position, the air passing through the radiator but not through the fan; Fig. 3 the summer parking position, air passing through the fan, but not through the radiator; and Fig 4 the summer driving position in which the air bypasses both the fan and the radiator.

The width of the conditioning chamber may differ in different installations. It may extend entirely across the dash of the automobile or it may be located only in the middle portion, as shown in Fig. 9, or it may be arranged on one side of the dash. The dimensions of the conditioning chamber and apparatus will depend upon the capacity requirements of the system, particularly as related to the volume of the enclosure to be ventilated. The filter must be of sufficient area to accomplish substantially complete removal of pollen and dirt particles without blowing the foreign materials through the filter into the system. It may be desirable to provide space for a small storage compartment 61 and radio 62. These and other considerations must determine the particular design and dimensions of the apparatus used in a particular installation.

If desired, a suitable shutter 27b (Figs. 2, 3, 4 and 10) may be arranged with openings corresponding with openings 27c to slide with respect to wall 27a in permitting a controlled flow of air from the conditioning chamber directly into the foot zone of the front seat of the vehicle.

Figure 12:
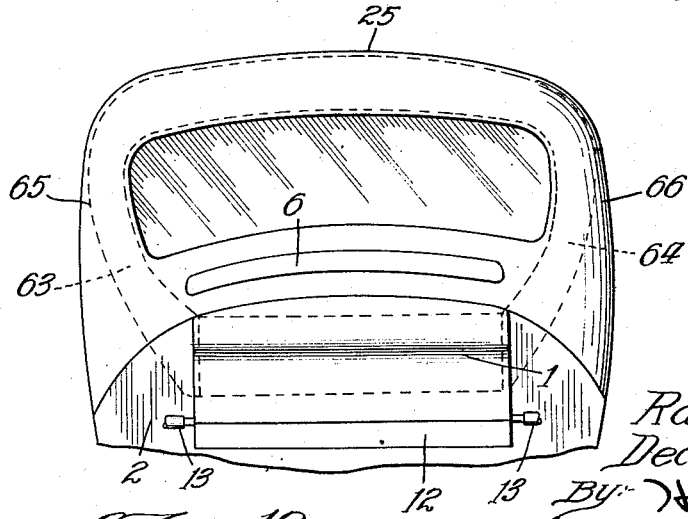
Fig. 12 is a view similar to Fig. 9 showing a modified duct arrangement.

In the modification of our invention shown in Fig. 12 the double windshield duct is replaced by ducts 63 and 64 enclosed within the foreside posts 65 and 66. This construction is somewhat less expensive but lacks the advantages attendant upon the use of the double windshield duct enumerated above.

In the modified arrangement of Fig. 17, ventilating air is taken into the system at the front of the car. The intake duct 67 opens to the atmosphere at 68, behind grille 69. A fan 70 is mounted within conditioning chamber 71 together with the filter 72 and radiator or other tempering unit 73. Deflectors 74 and 75 pivot at 76 and 77, respectively, permitting manipulation thereof to the dotted line positions shown either to direct the air through the fan or to by-pass the air, as when the automobile is moving, and either to cause the air to pass through radiator 73 or under it, depending on whether tempering is or is not desired. Armored piano wire controls 78 and 79 are used to manipulate the fan deflector and the radiator deflector, respectively. Filter 72 is replaceable by removing cap 80. Air from the conditioning chamber passes into supply duct 81, the latter passing upwardly through the center side post 82 of the car to the plenum chamber 83 subjacent the top thereof to be distributed into the enclosure by control panel 84 and distributing panel 85 as fully described in connection with Fig. 1. The side posts on both sides of the car may be used to conduct the air to the plenum chamber. If desired, small, adjustable side branches 86 and 87 may be provided to supply additional air to the foot zones. The air may be exhausted from the enclosure through vents near the floor as described in connection with Fig. 1.

A ventilating system for the automobile of tomorrow in which the motor is disposed in the rear end of the vehicle is shown in Figs. 13 to 16. The air-conditioning equipment is located in the space between the motor and the rear seat of the automobile. Air taken in at grille 88 passes through intake duct 89 to conditioning chamber 90. Radiator 91, filter 92 and fan 93 are mounted in this chamber. Adjustable deflector 94 is hinged at 95 to direct the air through the radiator or around the radiator, depending on whether the deflector is in the full line position or in the dotted line position. Armored piano wire cable 96 is used to control deflector 94 in the embodiment shown. The two parts 97 and 98 of the housing surrounding fan 93 are hingedly mounted for manipulation in directing the air through the fan or around it. These plates serve as baffles to restrict air flow to the fan area when the fan is in use but open the area surrounding the fan when there is no need to use the fan and when it is desired to remove the restriction to the induced air flow which is offered by the fan. Air from conditioning chamber 90 passes into ducts 99 and 100 on the sides of the car, shown in dotted lines in the plan view of Fig. 14, into plenum chamber 101 to be distributed into the automobile enclosure through apertured panels 102 and 103.

In the constructions which do not use a double windshield to conduct the air from the conditioning chamber to the plenum chamber, it may be desirable to provide an adjustable elongated opening in the forward end of the distributing panel, over the windshield, to permit a flow of air from the plenum chamber downwardly. Such an arrangement is shown in the detail view of Fig. 15. The windshield 104 is continuously wiped by the current of air from opening 105, as shown by the arrow, and moisture condensation thereon is prevented.

If desired, the automobile of Fig. 13 may be provided with an auxiliary windshield 106 (Fig. 16) to cause air from opening 105 to pass between the panes of the double windshield construction. The advantages above enumerated may be thus obtained with the additional advantage of a supply of tempered air for the front foot zone of the vehicle from opening 107.

Although we have shown certain specific embodiments of our invention, we do not wish to be limited to these particular structures to the exclusion of their equivalents. For example, the order of the instrumentalities within the conditioning chambers may be varied, that is, the air may pass through the filter first and afterwards through the fan and radiator, or in any other order. The air inlet for the system may be located at any pressure area other than the cowl or at the forward grille. Numerous other modifications may be made without departing from the spirit of the invention.

We claim:

1. In combination with a vehicle of the closed type, a ventilating system including an air duct system and comprising an air inlet for admitting air into the system, a sheet-like apertured air-distributing member spaced below the top of said vehicle to form a plenum chamber superjacent the passenger compartment thereof, and duct means establishing communication between said inlet and said plenum chamber, one or more openings being provided in said air-distributing member and an adjustable deflector arranged in each of said openings, said deflector comprising a curved blade having a slot therein said blade being of sufficient area to cover said opening and hinged at one edge of said opening on the upper surface of said air-distributing member, a support mounted upon said vehicle and within said plenum chamber, a lever pivotally mounted at one end to said support above said air-distributing member, and having a ratchet portion on the free end, said free end extending through said slot in said blade, spring means urging said lever downwardly to cause said ratchet portion to engage one edge of said slot, and spring means urging said deflector blade to normal closed position.

2. Apparatus for conditioning ventilating air supplied to the passenger compartment of a vehicle comprising, in combination, a conditioning chamber mounted on the dash of said vehicle, an air inlet located at a pressure area and communicating with said chamber, an air-tempering unit mounted within said chamber, a fan housing movably mounted within said chamber and a fan mounted in said fan housing, control means attached to said fan housing and extending without said chamber for manipulating said fan housing, and means for distributing air passing through said tempering unit into said passenger compartment, said fan housing being adapted to be shifted into the air circuit to operate upon incoming air and to be removed from the air circuit to by-pass incoming air by manipulation of said control means.

3. Apparatus for conditioning ventilating air supplied to the passenger compartment of a vehicle comprising, in combination, a conditioning chamber mounted on the dash of said vehicle, an air inlet located at a pressure area and communicating with said chamber, an air-tempering unit mounted within said chamber, a support upon one wall of said chamber, a V-section fan housing extending across said chamber and journaled upon said support to rotate about said journal, a fan mounted in the free leg of said fan housing, control means attached to said fan housing at a point other than the journaled extremity thereof and extending without said chamber for manipulating said fan housing, and means for distributing air passing through said tempering unit into said passenger compartment, said fan housing being adapted to be rotated to a position in the air circuit to operate upon incoming air and to be rotated into a position in which the fan is removed from the air circuit to thereby permit incoming air to by-pass said fan.

4. In combination with a vehicle having a passenger compartment and an engine compartment separated by a dash having an aperture therein, an air-conditioning chamber within said engine compartment mounted on said dash and covering said aperture, an air filter arranged in said aperture, an air-tempering unit within said chamber mounted on the forward wall and extending the width thereof, an air inlet opening into said chamber at the top rear thereof, a movable deflector mounted above said aperture and rearwardly of said chamber and extending downwardly from said inlet toward the rear edge of said tempering unit, a V-section fan housing hinged to the forward wall of said chamber and having a fan mounted in the free leg thereof, said fan housing being swingable into and out of the air stream issuing from said inlet, said deflector being swingable to direct said air stream through said tempering unit or directly to said opening, means for manipulating said fan housing and said deflector from without said chamber, and means for conducting air passing through said filter into said passenger compartment.

5. Apparatus for conditioning ventilating air supplied to the passenger compartment of a vehicle comprising, in combination, a conditioning chamber mounted on the dash of said vehicle, a cowl air inlet communicating with said chamber, an air-tempering unit mounted in spaced relation to the floor and on the forward wall of said chamber, a V-section fan housing extending the width of said chamber and hinged on the forward wall of said chamber at the extremity of one leg and having an aperture in the free leg thereof, a fan mounted in said aperture, a deflector within said chamber journaled at the rear of said chamber and extending the width of said chamber and to the rearward edge of said tempering unit, said fan housing and deflector being arranged to cooperate in causing incoming air to flow through said conditioning chamber in a predetermined circuit, means for manipulating said fan housing and deflector from without said chamber to direct the air issuing from said inlet either through or around said fan housing and either through or around said tempering unit, and means for conducting conditioned air from said chamber to said passenger compartment.

6. Apparatus in accordance with claim 3 and including synchronized control means for manipulating said fan housing and said deflector comprising a stationary arcuate index plate mounted on the instrument panel of the vehicle and having a first and a second peripheral slot therein, a sliding index plate concentric with said stationary plate and arranged to bear against a surface of said stationary plate and having an opening registering with the first slot of said stationary plate and a slot registering with the second slot of said stationary plate, a deflector manipulating lever projecting through said first slot and pivoted at the center of curvature of said index plates, a fan housing manipulating lever projecting through said second slot and pivoted at the center of curvature of said index plates, mechanical linkage connecting said deflector and fan housing manipulating levers with said deflector and said fan housing, respectively, and stop means in said first slot and in said slot in said sliding index plate registering with said second slot, the dimensions and arrangement of said synchronized control means being such that manipulation of said deflector automatically manipulates said fan housing while said fan housing may be manipulated independently of said deflector.

7. Apparatus for conditioning ventilating air supplied to a vehicle comprising a conditioning chamber mounted on the dash of said vehicle, air inlet and outlet means for said chamber, air tempering means and filtering means within said chamber, air-impelling means within said chamber mounted to be movable into or out of the path of air entering through said inlet, and control means extending from outside said chamber into said chamber for moving said air-impelling means into or out of the path of incoming air.

8. Apparatus for ventilating a vehicle of the closed type which includes a perforated sub-roof member forming a plenum chamber with the top of the vehicle, said perforated member serving to distribute air to the passenger compartment, additional openings in said perforated member, an adjustable deflector arranged in each of said openings, and means for delivering treated fresh air to said plenum chamber for delivery to the passenger compartment through said perforated member.

9. A vehicular air conditioning system including an overhead plenum chamber, a panel forming the lower wall of said plenum chamber, means for supplying treated air to said plenum chamber, openings in said panel, and adjustable deflectors arranged in each of said openings, each deflector comprising a curved blade having a slot therein, said blade being of sufficient area to cover the opening and hinged at one edge to the upper surface of the panel, a lever pivoted at one end above said panel and having a ratchet portion on its free end, said free end extending through the slot in said blade, spring means urging said lever in a direction to engage said ratchet portion with said slot, and spring means urging said deflector blade to closed position.

10. Air distributing means comprising a plenum chamber, a panel forming one wall of said chamber and the ceiling of occupied space, said panel having perforations establishing constant communication between said chamber and the occupied space, means for delivering ventilating air to said plenum chamber, an opening in said panel, and a deflector pivoted at one edge to the upper surface of said panel and within said plenum chamber for adjusting the flow of air through said opening, said adjustment being accomplished entirely above the plane of the ceiling in order that no obstruction is presented below the ceiling.

11. In combination with a vehicle of the closed type having a passenger compartment and a motor compartment, an air-conditioning and ventilating system comprising a conditioning chamber having an inlet and a single outlet and disposed within said motor compartment, an intake grille in the forward extremity of said vehicle, an intake duct extending from said grille and communicating with said chamber at said inlet, an air-tempering unit and an air filter and a fan mounted in operative series in the air circuit within said conditioning chamber, means for by-passing at least a portion of the incoming air around said tempering unit, means for by-passing incoming air around said fan to said outlet, an apertured panel member substantially co-extensive with and spaced below the top of said vehicle to form a plenum chamber, and means for conducting conditioned air from said conditioning chamber to said plenum chamber, the forward edge of said apertured panel member being extended to the upper edge of the windshield of said vehicle and defining a narrow slit between said forward edge and the wall of said vehicle whereby to permit air from said plenum chamber to flow downwardly over the inside surface of said windshield.

12. In combination with a vehicle of the closed type having a passenger compartment and a motor compartment, an air-conditioning and ventilating system comprising a conditioning chamber having an inlet and a single outlet and disposed within said motor compartment, an intake grille in the forward extremity of said vehicle, an intake duct extending from said grille and communicating with said chamber at said inlet, an air-tempering unit and an air filter and a fan mounted in operative series in the air circuit within said conditioning chamber, means for by-passing at least a portion of the incoming air around said tempering unit, means for by-passing incoming air around said fan to said outlet, an apertured panel member substantially co-extensive with and spaced below the top of said vehicle to form a plenum chamber, and means for conducting conditioned air from said conditioning chamber to said plenum chamber, said vehicle having a pair of spaced apart windshields, said apertured panel member being extended forwardly to the upper edge of the inner windshield, the space between said windshields being in communication with said plenum chamber at the top of said windshields and with the passenger compartment of said vehicle at the bottom of said windshields whereby to permit air from said plenum chamber to pass between said windshields and into said passenger compartment.

RALPH F. NORRIS.
DEAN G. THOMAS.